(12) United States Patent
Plessier

(10) Patent No.: US 6,275,837 B1
(45) Date of Patent: Aug. 14, 2001

(54) METHOD FOR THE IMPLEMENTATION OF AN ELEMENTARY MODULAR OPERATION ACCORDING TO THE MONTGOMERY METHOD

(75) Inventor: Bernard Plessier, Aix en Provence (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/244,217

(22) Filed: Feb. 4, 1999

(30) Foreign Application Priority Data

Feb. 9, 1998 (FR) .................................................. 98 02149

(51) Int. Cl.[7] ....................................................... G06F 7/00
(52) U.S. Cl. ............................................................. 708/492
(58) Field of Search ...................................... 708/491–492

(56) References Cited

U.S. PATENT DOCUMENTS

| 5,745,398 | * | 4/1998 | Monier | 708/492 |
| 5,764,554 | * | 6/1998 | Monier | 708/491 |
| 5,948,051 | * | 9/1999 | Monier | 708/492 |
| 6,035,317 | * | 3/2000 | Monier | 708/492 |

FOREIGN PATENT DOCUMENTS 0 784 262 A1   7/1997  (EP) .................................. G06F/7/72

OTHER PUBLICATIONS

C. Yang et al., "*The IC Design of a High Speed RSA Processor,*" IEEE Asia–Pacific Conference on Circuits and Systems, Nov. 18, 1996, pp. 33–36.
C. Walter, "*Systolic Modular Multiplication,*" IEEE Transactions on Computers, vol. 42, No. 3, Mar. 1, 1993, pp. 376–378.

* cited by examiner

*Primary Examiner*—Tan V. Mai
(74) *Attorney, Agent, or Firm*—Theodore E. Galanthay; Allen, Dyer, Doppelt, Milbrath & Gilchrist, P.A.

(57) ABSTRACT

A Pfield operation defined according to the Montgomery method by $P_{field}(A, B)_N = A*B*I \bmod N$, where I is a determinable error, is implemented in a processor. The least significant word of the data elements A and N which are stored in elementary sub-registers are shifted twice. This eliminates delay cells in a processor used for executing the Pfield operation.

4 Claims, 3 Drawing Sheets

METHOD FOR THE IMPLEMENTATION OF AN ELEMENTARY MODULAR OPERATION ACCORDING TO THE MONTGOMERY METHOD

FIELD OF THE INVENTION

The invention relates to the field of computations, and, more particularly, to a modular computation according to the Montgomery method.

BACKGROUND OF THE INVENTION

Modular computations according to the Montgomery method are performed in a finite field, or Galois field, denoted as $GF(2^n)$. Conventionally, modular operations on $GF(2^n)$ are used in cryptography for applications, such as the authentication of messages, the identification of a user, and the exchange of cryptographic keys. Exemplary applications are described, for example, in the French Patent Application FR-A 2,679,054.

There are commercially available integrated circuits dedicated to such applications. These include, for example, the product referenced as ST16CF54, which is manufactured by SGS-THOMSON MICROELECTRONICS S.A. This product is built around a central processing unit and an arithmetic coprocessor, and is dedicated for performing modular computations. The coprocessor enables processing of modular multiplication operations using the Montgomery method, which is disclosed in U.S. Pat. No. 5,513,133.

The basic operation, called a $P_{field}$ operation, includes generation of a binary data element denoted as $P(A, B)_N$ and encoded on n bits, such that $P(A, B)_N = A*B*I \bmod N$, with $I = 2^{-n} \bmod N$. The generation of the binary data element is based on three binary data elements A (multiplicand), B (multiplier) and N (modulus) encoded on a whole number of n bits. For this purpose, it is assumed that the data elements are encoded on m words of k bits, with $m*k=n$, and the words of A and B are provided to a multiplication circuit having a series input, a parallel input, and a series output.

For the coprocessor described in the referenced U.S. patent application, k=32 and m=8 or 16. FIG. 1 shows the modular arithmetic coprocessor disclosed in the referenced U.S. patent application. This coprocessor has the following elements. Three m*k bit shift registers 10, 11 and 12, including one series input and one series output. These shift registers 10–12 receive respectively the multiplier B, the result S and the modulus N. A multiplexer 13 with three series inputs includes one series output connected to the input of the register 10. A first input is connected to a first input terminal, and a second input is connected to the output of the register 10. A multiplexer 14 with two series inputs has one series output connected to the input of the register 11. A first input is connected to a logic 0.

The coprocessor further includes a multiplexer 15 having three series inputs and one series output connected to the input of the register 12. A first input is connected to a second input terminal, and a second input is connected to the output of the register 12. Three k-bit shift registers 16, 17 and 18 have one series input and one parallel output. These registers 16–18 receive respectively k bits of the multiplicand A, a computation parameter referenced $J_0$, and an intermediate result referenced $Y_0$. The input of the register 17 is connected to a third input terminal. Two multiplication circuits 19 and 20 each have a series input, a k-bit parallel input and a series output. Two k-bit registers 21 and 22 have a parallel input and a parallel output. The input of the register 21 is connected to the output of the register 16. The output of the register 21 is connected to the input of the multiplication circuit 19. The output of the register 22 is connected to the input of the multiplication circuit 20.

Furthermore, the coprocessor includes a multiplexer 23 with two parallel inputs and one parallel output. A first input of the multiplexer 23 is connected to the output of the register 17. A second input of the multiplexer 23 is connected to the output of the register 18. The output of the multiplexer 23 is connected to the input of the register 22. Two multiplexers 24, 25 each have two series inputs and one series output. The output of the multiplexer 24 is connected to the input of the register 16. A first input of the multiplexer 24 is connected to a fourth input terminal. The output of the multiplexer 25 is connected to the series input of the multiplication circuit 19. A first input of the multiplexer 25 is connected to a logic 0.

A multiplexer 26 has three series inputs and one output. The output is connected to the series input of the multiplication circuit 20, and a first input is connected to a logic 0. Three subtraction circuits 27, 28 and 29 each include two series inputs and one series output. The first input of the circuit 27 is connected to the output of the register 10. The output of the circuit 27 is connected to each of the second inputs of the multiplexers 24 and 25 and also to an output terminal. The first input of the circuit 28 is connected to the output of the register 11. Two addition circuits 30 and 31 each have two series inputs and one series output. The first input of the circuit 30 is connected to the output of the circuit 28. The second input of the circuit 30 is connected to the output of the circuit 19. The output of the circuit 30 is connected to a second input of the multiplexer 26. The output of the circuit is connected to a first input of the circuit 29, and to a second input of the multiplexer 14, and to each of the third inputs of the multiplexers 13 and 15.

Three delay cells 32, 33 and 34, which are actually k-bit shift registers, have a series input and a series output. The output of the cell 32 is connected firstly to a third input of the multiplexer 26 and secondly to the input of the cell 33. The output of the cell 33 is connected to a second input of the circuit 29. The input of the cell 34 is connected to the output of the circuit 30. The output of the cell 34 is connected to a first input of the circuit 31. A comparison circuit 35 has two series inputs and two outputs. A first input is connected to the output of the circuit 31. A second input is connected to the output of the circuit 29.

Two multiplexers 36 and 37 each have two series inputs, one selection input, and one output. Each of the first series inputs is connected to a logic 0. Each of the selection inputs is connected to one of the outputs of the circuit 35. The output of the multiplexer 36 is connected to a second input of the circuit 27. The output of the multiplexer 37 is connected to a second input of the circuit 28. A multiplexer 38 has two inputs and one output. A first input is connected to a logic 1. A second input is connected to the output of the register 12. The output is connected firstly to the input of the cell 32, and secondly to the second inputs of the multiplexers 36 and 37. A demultiplexer 39 has one input and two outputs. The input is connected to the output of the circuit 20. A first output is connected to the input of the register 18. A second output is connected to a second input of the circuit 31.

For further details on forming certain elements, reference may be made to the previously referenced U.S. patent. To carry out an elementary operation known as a $P_{Field}$ operation of the type $P_{Field}(A, B)_N = A*B*I \bmod N$, with A and B encoded on m words of k bits, and I is an error equal to $2^{-m*k}$, iteration of the following loop is performed m times with i as an index varying from 1 to m:

$X=S(i)+A_{i-1}*B$, $Y_0=(X*J_0) \bmod 2^k$, $Z=X+(N*Y_0)$, $S(i)=Z\backslash 2^k\backslash$ is an integer division, if $S(i)$ is greater than N, then N is subtracted from S at the next iteration, with $S(0)=0$, $A_i$ is the k bit word with the significance i, $J_0$ is a k bit word defined by the equation $((N*J_0)+1) \bmod 2^k=0$.

The coprocessor of FIG. 1 enables the performance of a full iteration by a simultaneous shift of m*k bits of the registers 10–12 respectively containing B, S(i−1) and N. This is followed by a 2*k bit shift of the register 12 to store S(i). The word $A_i$ is loaded into the register 21 and the word $J_0$ is loaded into the register 17. To perform the full computation of $P_{Field}(A, B)_N$, it is enough to repeat each iteration m times by changing the word $A_i$ contained in the register 21 during each iteration.

The operation $X=S(i-1)+A_i*B$ is performed by the multiplication circuit 19 and the addition circuit 30. The operation $Y_0+(X*J_0) \bmod 2^k$ is performed during the k first shifts in the multiplication circuit 20. Care is taken to store $J_o$ in the register 22. The result $Y_0$ is stored in the register 18. The operation $Z=X+(N*Y_0)$, with N and X having been delayed by k bits in the delay cells 32 and 34 and $Y_0$ having been placed in the register 22, is performed by the multiplication circuit 20 and addition circuit 31. The operation $S(i)=Z\backslash 2^k$ is performed by a k bit shift The comparison of S(i) with N is performed by the subtraction of N from S(i) in the subtraction circuit 29. N is delayed by k bits in the cell 33. Any overflow is detected and stored in the comparison circuit 35 to find out the result of the comparison. The subtraction of N from S(i) is done during the following iteration in the subtraction circuit 28.

The coprocessor described in the referenced U.S. patent has the drawback of carrying out computations in a fixed manner on a number either of 256 bits or of 512 bits. A first improvement disclosed in U.S. Pat. No. 5,745,398 seeks to provide greater flexibility in use by enabling the performance of $P_{field}(A, B)_N$ operations with A having a variable size.

A second improvement disclosed in a referenced European Patent Application EP-A 784,262 seeks to reduce the exchanges of data between the coprocessor and external to the coprocessor during the performance of modular operations. This is achieved by the addition of an additional register of m*k bits to store A integrally when A has a size smaller than m*k bits.

Furthermore, there are known m*k bit shift registers organized in banks of m k-bit sub-registers for reducing the use of the registers. The use is reduced for, at most, by 2*k storage cells which are used simultaneously. For a more detailed disclosure on these registers, those skilled in the art are directed to the French Patent Application filed on Jul. 4, 1997, under number 9,708,516. This French Patent Application corresponds to the U.S. Patent Application, filed Jun. 26, 1997 having Ser. No. 09/105,560. One drawback of the registers organized in banks of sub-registers is that they occupy a greater silicon surface area of an integrated circuit than standard registers.

SUMMARY OF THE INVENTION

An object of the invention is to reduce the size of the circuit, while at the same time using the registers organized in banks of sub-registers. The invention eliminates the delay cells 32 and 34 to increase surface area through a new sequencing of the coprocessor.

An object of the invention is to provide a method for the implementation of an elementary operation, called a Pfield operation, defined according to the Montgomery method by $P_{field}(A, B)N=A*B*I \bmod N$, where A, B and N are integers encoded respectively on $\alpha$, b and n words of k bits. N is an odd-parity number, b and n are non-zero integers smaller than or equal to an integer m, and $\alpha$ and m are non-zero integers.

The method implements a first k-bit register designed to successively receive words $A_{i-1}$ of k bits of A. A second m*k bit shift register is designed to store B. A third m*k bit shift register is designed to store an updated result referenced S(i). A fourth m*k bit shift register is designed to store N. The second to fourth registers are organized in banks of m sub-registers for enabling shifts by k bit words. First, there is a k-bit shift of the least significant words of the second to fourth registers using computation means for the serial production of an intermediate data element $Y_0+((-N_0^{-1} \bmod 2^k)*(B*A_{i-1}+S(i-1)) \bmod 2^k$ that is stored in a fifth k bit register. Then there is a second n*k bit shift of the total words B, S(i−1) and N contained in the second to fourth registers using computation means for the serial production of the updated data element S(i).

Preferably, the following steps E1 to E3 are repeated $\alpha$ times, where i is an integer index varying from 1 to $\alpha$ that is incremented following each repetition of steps:

Step E1: Computation of Yo, where a k-bit shift is made in the least significant words of B, S(i−1) and N respectively contained in the second to third registers. Each of these registers has its input connected to its output to keep the k-bit word in one and the same sub-register after having provided it. During the shifts, $A_{i-1}*B_0$ is produced in a first multiplication circuit. $N_0$ is subtracted from $S(i-1)_0$ in a first subtraction circuit if S(i−1) is greater than N. The k least significant bits of $X=S(i-1)+A_i*B$ are produced in a first addition circuit by adding up the output result from the first multiplication circuit with the output result from the first subtraction circuit. $Y_0$ is produced by multiplying the k least significant bits of X by $-N_0^{-1} \bmod 2^k$ in a second multiplication circuit. The output result of the multiplication circuit is stored in the fifth register.

Step E2: Computation of S(i) by a simultaneous shift of n*k bits is performed on the contents of the second to fourth registers. The first multiplication circuit performs the multiplication $B*A_{i-1}$. N is subtracted from S(i−1) in the first subtraction circuit if S(i−1) is greater than N. $X=S(i-1)+A_i*B$ is produced in the first addition circuit by adding up the output result from the first multiplication circuit with the output result from the first subtraction circuit. $X*Y_0$ is produced in the second multiplication circuit. $Z=X+(N*Y_0)$ is produced in a second addition circuit by adding up the output result from the first multiplication circuit with the output result from the first addition circuit. The k first output bits from the second addition circuit are overlooked. The new updated result S(i) is stored in the third register 11. The k-bit word $Z_1$ corresponds to the second least significant word of Z, which becomes the least significant word of the updated result S(i).

Step E3: Comparison of S(i) with N, where S(i) is compared with N and the result of the comparison is stored by using comparison means. The result of the comparison of N with S(i) is to be taken into account during repetition of the steps E1 and E2.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
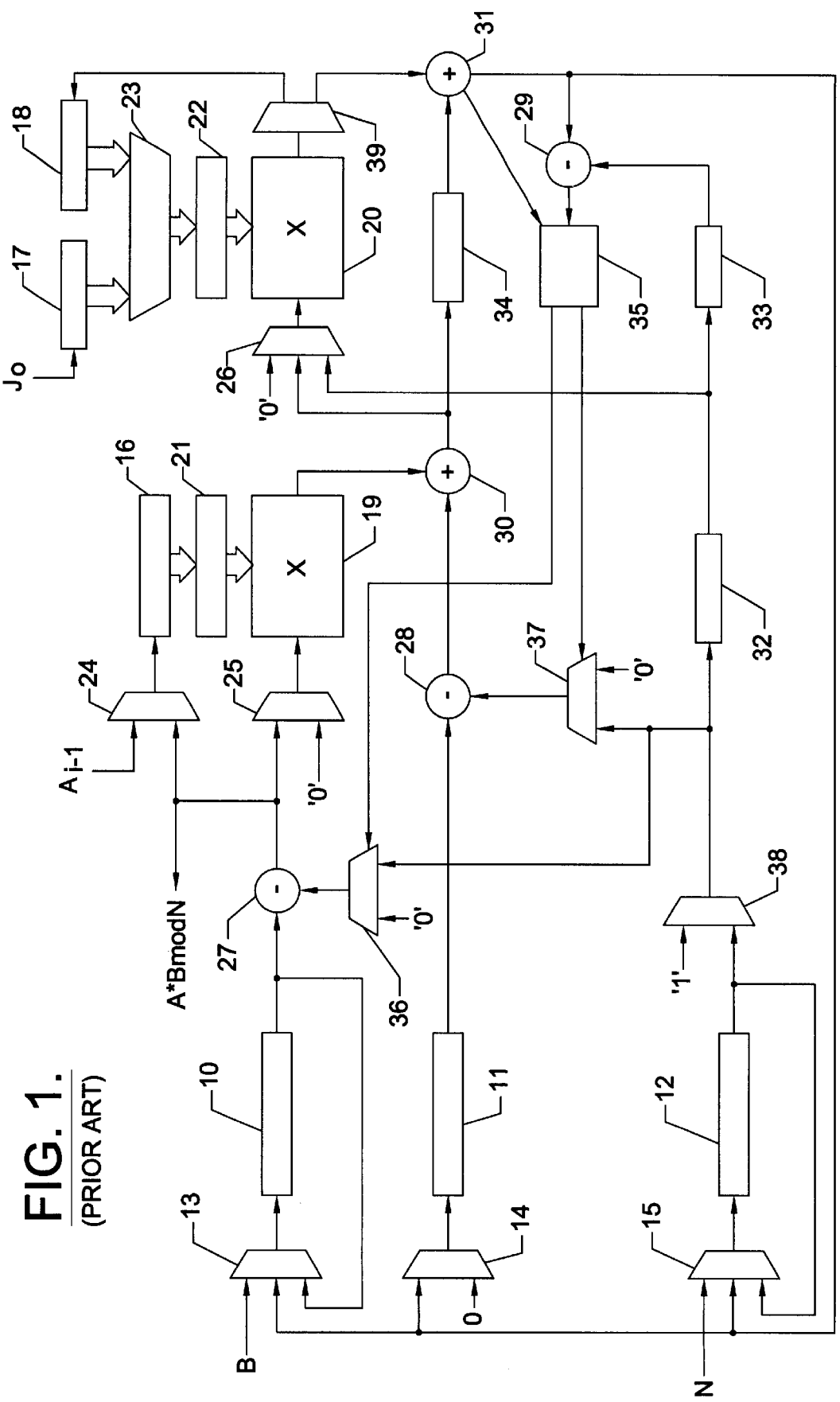
FIG. 1 shows a coprocessor according to the prior art.
Figure 2:
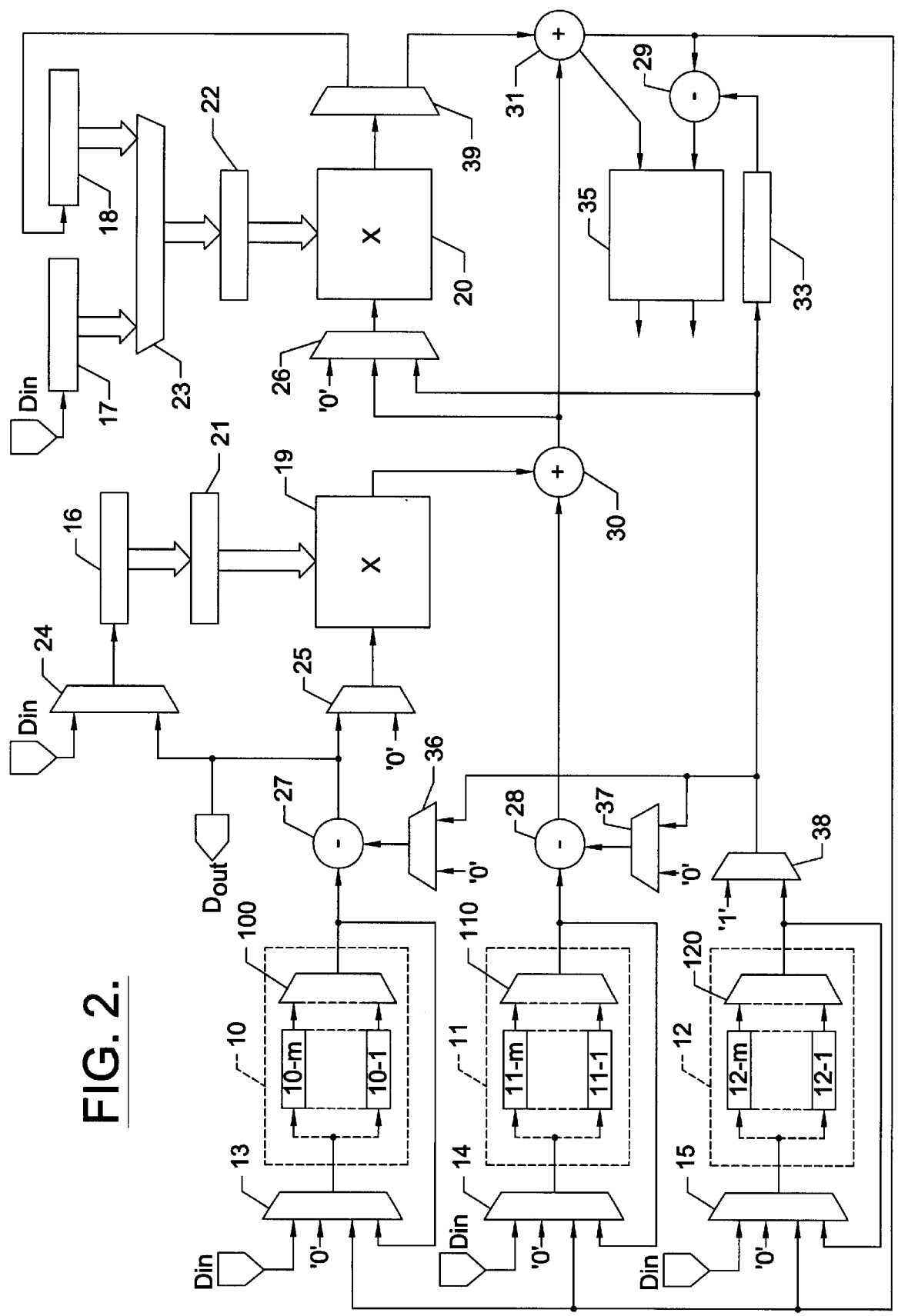
FIGS. 2 and 3 show coprocessors according to the present invention.

The drawing of FIG. 2 shows a coprocessor according to the present invention. The coprocessor includes three m*k bit shift registers 10, 11 and 12 each having one series input and one series output. These shift registers 11-12 are designed to receive respectively the multiplier B, the result S and the modulus N. Each of the registers is organized in banks of m k-bit sub-registers referenced 10-1 to 10-m, 11-1 to 11-m and 12-1 to 12-m whose inputs are grouped together to form the input respectively of the registers 10, 11 and 12. The outputs of the subregisters 10-1 to 10-m, 11-1 to 11-m and 12-1 to 12-m are connected respectively to three m-input multiplexers 100, 110 and 120. The output of each multiplexer 100, 110 and 120 forms the output of each of the registers 10–12.

Three multiplexers 13–15 include four series inputs and one series output. A first input of each of the multiplexers 13–15 is connected to an input terminal Din. A second input of each of the multiplexers 13–15 receive a logic 0. A third input of each of the multiplexers 13–15 is connected respectively to the output of each of the registers 10–12. The output of each of the multiplexers 13–15 are connected respectively to the input of each of the registers 10–12. Three k-bit shift registers 16, 17 and 18, having one series input and one parallel output, are designed to receive respectively k bits of the multiplicand A, a computation parameter referenced $J_0$, an intermediate result referenced $Y_0$. The input of the register 17 is connected to a third input terminal. Two multiplication circuits 19 and 20 each have a series input, a k-bit parallel input and a series output. Two k-bit registers 21 and 22 have a parallel input and a parallel output. The input of the register 21 is connected to the output of the register 16. The output of the register 21 is connected to the input of the multiplication circuit 19. The output of the register 22 is connected to the input of the multiplication circuit 20.

A multiplexer 23 includes two parallel inputs and one parallel output. A first input of the multiplexer 23 is connected to the output of the register 17. A second input of the multiplexer 23 is connected to the output of the register 18. The output of the multiplexer 23 is connected to the input of the register 22. Two multiplexers 24, 25 each have two series inputs and one series output. The output of the multiplexer 24 is connected to the input of the register 16. A first input of the multiplexer 24 is connected to a fourth input terminal. The output of the multiplexer 25 is connected to the series input of the multiplication circuit 19. A first input of the multiplexer 25 is connected to a logic 0. A multiplexer 26 has three series inputs and one output. The output is connected to the series input of the multiplication circuit 20. A first input is connected to a logic 0. Three subtraction circuits 27, 28 and 29 each comprises two series inputs and one series output. The first input of the circuit 27 is connected to the output of the register 10. The output of the circuit 27 is connected to the second inputs of the multiplexers 24 and 25 and also to an output terminal Dout. The first input of the circuit 28 is connected to the output of the register 11.

Two addition circuits 30 and 31, each have two series inputs and one series output. The first input of the circuit 30 is connected to the output of the circuit 28. The second input of the circuit 30 is connected to the output of the circuit 19. The output of the circuit 30 is connected to a second input of the multiplexer 26 and to a first input of the circuit 31. The output of the circuit 31 is connected to a first input of the circuit 29 and to the fourth inputs of the multiplexers 13, 14 and 15. A delay cell 33 that is actually a k-bit shift register, has one series input and one series output. The output of the cell 33 is connected a second input of the circuit 29. A comparison circuit 35 has two series inputs and two outputs. A first input is connected to the output of the circuit 31. A second input is connected to the output of the circuit 29. Two multiplexers 36 and 37 each have two series inputs and one output. Each of the first series inputs are connected to a logic 0. Each of the multiplexers 36 and 37 are controlled by one the outputs of the circuit 35 (not shown in the drawing). The output of the multiplexer 36 is connected to a second input of the circuit 27. The output of the multiplexer 37 is connected to a second input of the circuit 28. A multiplexer 38 has two series inputs and one series output. A first input is connected to a logic 1. A second input is connected to the output of the register 12. The output is connected to the input of the cell 33 and to the second inputs of the multiplexers 36 and 37 and to a third input of the multiplexer 26. A demultiplexer 39 has one input and two outputs. The input is connected to the output of the circuit 20. A first output is connected to the input of the register 18. A second output is connected to a second input of the circuit 31.

For the coprocessor of FIG. 2, a single input terminal is used to load the data elements into the registers 10, 11, 12, 16 and 17. It is possible to use five input terminals if it is desired to carry out the simultaneous loading of all the data elements in all the registers 10, 11, 12, 16 and 17. To explain operation of such a circuit for implementing the $P_{Field}(A, B)_N = A*B*I \bmod N$ type, it is appropriate to assume that A is an integer encoded on $\alpha$ words of k bits, B is an integer encoded on b words of k bits, N is an odd-parity integer encoded on n words of k bits. In addition, $\alpha$, b and n are positive integers, with b and n being smaller than or equal to m. Furthermore, b is necessarily smaller than or equal to n.

The circuit must first of all be initialized. Initialization is performed as follows. B is loaded into the register 10, the least significant word of B is, for example, in the sub-register 10-1. N is loaded into the register 12, the least significant word of N is, for example, in the sub-register 12-1. The register 11 is initialized at logic 0. The contents are called S(0) and are encoded on n words of k bits. A computation parameter $J_0$ is loaded into the register 17. $J_0$ is computed beforehand and is equal to $-N_0^{-1} \bmod 2^k$. The comparison circuit is initialized so that the multiplexers 36 and 37 have their outputs which provide a logic 0. The word $A_0$, corresponding to the least significant k-bit word of A, is loaded into the register 16. The initialization of the circuit can be done only partially. At the end of a computation, the coprocessor contains data elements that may be re-used and are already in the right register.

In order to implement the elementary $P_{Field}$ operation, the following steps 1–6 are repeated $\alpha$ times, wherein i is an integer index varying from 1 to α that is incremented at the end of each repetition of steps:

Step 1: $A_{i-1}$ is loaded into the register 21 and $J_0$ is loaded into the register 22. The addition circuits 30 and 31, subtraction circuits 27–29 and the multiplication circuits 19 and 20 are initialized.

Step 2: Computation of $Y_0$ is performed. A k-bit shift is made in the contents of the sub-registers 10-1, 11-1 and 12-1 corresponding to the least significant word of respectively B, S(i−1) and N. Each of these registers has its input connected to its output to keep the k-bit word in the same sub-register 10-1, 11-1 and 12-1 after having provided the word. During the shifts, $A_{i-1}*B_0$ is produced in the multiplication circuit 19. $N_0$ is subtracted from $S(i-1)_0$ in the subtraction circuit 28 if S(i−1) is greater than N. The k least significant bits of $X=S(i-1)+A_i*B$ are produced in the addition circuit 30 by adding the output result from the multiplication circuit 19 with the output result from the subtraction circuit 28. $Y_0$ is produced by multiplying the k least significant bits of X by $J_0$ in the multiplication circuit 20. The output result from the multiplication circuit 20 is stored in the register 18.

Step 3: $Y_0$ is loaded into the register 22. The addition circuits 30 and 31, subtraction circuits 27 to 29 and the multiplication circuits 19 and 20 are initialized.

Step 4: Computation of S(i) is performed. A simultaneous shift by n*k bits is made in the contents of the registers 10, 11 and 12. The multiplication circuit 19 performs the multiplication $B*A_{i-1}$. N is subtracted from S(i−1) in the subtraction circuit 28 if S(i−1) is greater than N. $X=S(i-1)+A_i*B$ is produced in the addition circuit 30 by adding the output result from the multiplication circuit 19 with the output result from the subtraction circuit 28. $X*Y_0$ is produced in the multiplication circuit 20. $Z=X+(N*Y_0)$ is produced in the addition circuit 31 by adding the output result from the multiplication circuit 20 with the output result from the addition circuit 30. The k first output bits from the addition circuit 31 are overlooked. S(i) is stored in the register 11. The k-bit word $Z_1$ corresponding to the second least significant word of Z becomes the least significant word of S(i) stored in the sub-register 11-1.

Step 5: Comparison of S(i) with N is performed. N is delayed by k bits and is subtracted from the output result of the addition circuit 31 in the subtraction circuit 29. The comparison circuit 35 controls and stores the state of the carry value of the subtraction circuit 29. The carry value corresponding to the result of the comparison of N with S(i) has to be taken into account during the next repetition of the steps 2 and 4.

Step 6: During execution of the steps 2 to 5, the word $A_i$ is loaded into the register 16.

To obtain the final result, the contents of the registers 11 and 12 are shifted and N is subtracted from S(a) if S(a) is greater than or equal to N. The result is then stored in the register 10 to bring it out of the coprocessor or is stored in the register 10, 11 or 12 if it is desired to use it in a following computation. For the method described, the error I is equal to $2^{-a*k}$.

It may be further noted that, in the method of the invention, the word $X_0$ is produced twice consecutively. The double production of the word $X_0$ enables the elimination of the delay cell whose function was to delay X for a duration equal to the computation of $Y_0$. This results in a first savings of k elementary register cells. This is also the case for the double output of the word $N_0$ used for the first time to compute $X_0$ and $Y_0$ and for the second time to compute X and Z. The double output of the word $N_0$ enables the elimination of the delay cell whose function was to delay N for a duration equal to the computation of $Y_0$. This results in a second savings of k elementary register cells.

Figure 3:
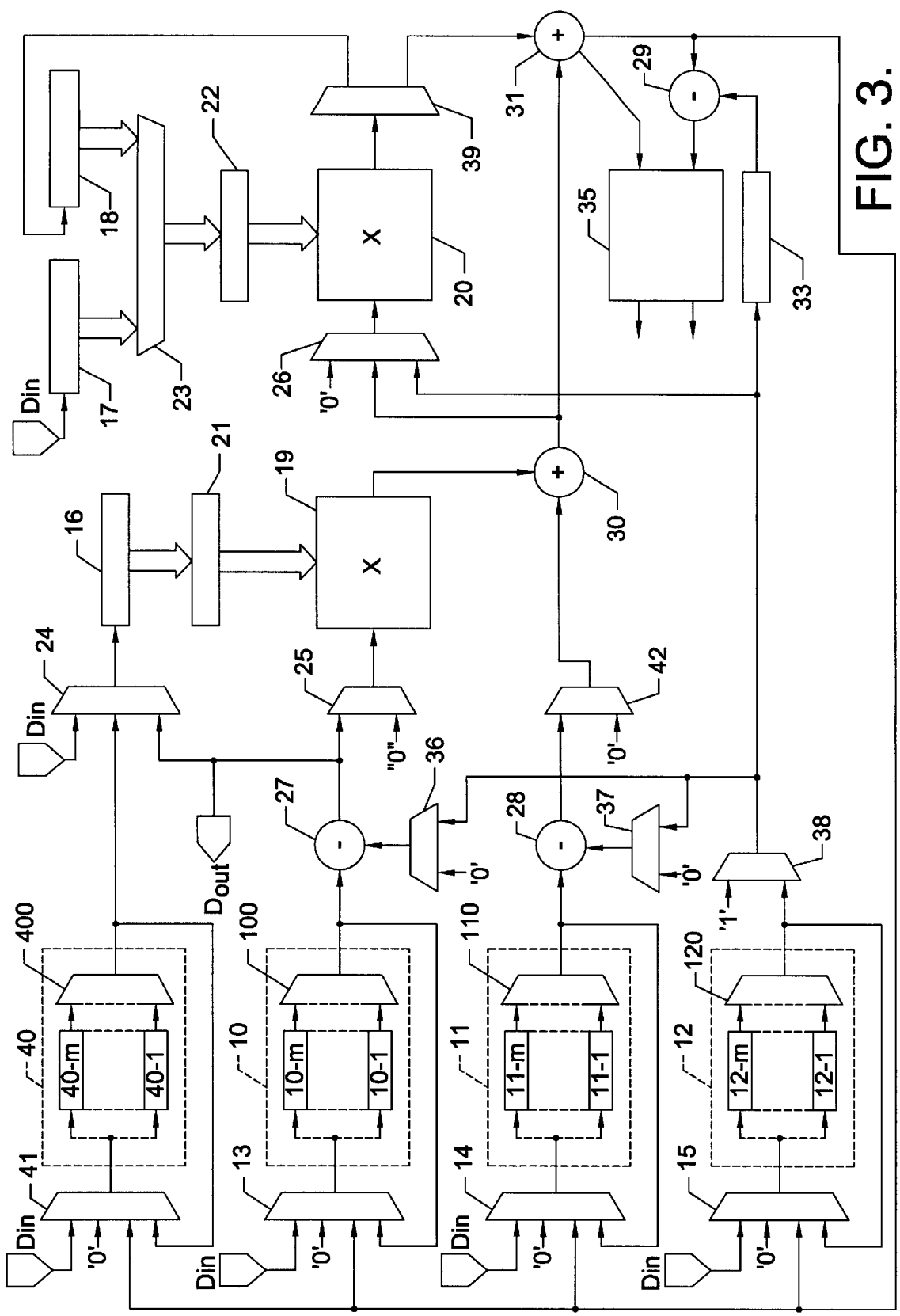

Alternative embodiments of the coprocessor are possible. The diagram of FIG. 3 implements a few possible improvements. In the coprocessor of FIG. 3, the output of the subtraction circuit 28 is no longer directly connected to the first input of the addition circuit 30. The other elements of the coprocessor of FIG. 2 remain unchanged. The coprocessor of FIG. 3 furthermore comprises the following multiplexers and shift registers as described in the following paragraphs.

An m*k bit shift register 40 has one series input and one series output and is designed to receive the data element A. The register 40 is organized in banks of m shift sub-registers of k bits 40-1 to 40-m whose inputs are grouped together to form the input of the shift register 40. The outputs of the subregisters 40-1 to 40-m are connected to an m input multiplexer 400. The output of the multiplexer 400 forms the output of the register 40.

A multiplexer 41 includes four series inputs and one series output. A first input is connected to an input terminal Din. A second input is for receiving a logic 0. A third input is connected to the output of the register 40. The fourth input is connected to the output of the addition circuit 31, and the output is connected to the input of the register 40.

A multiplexer 42 has two series inputs and one series output. A first input is connected to the output of the subtraction circuit 28. The second input is for receiving a logic 0. The output is connected to the first input of the addition circuit 30.

The register 40 is used to store A to prevent exchanges of data external to the coprocessor when a is smaller than or equal to m. The addition does not change execution of the steps implemented above, but they are necessary to provide for the preliminary loading of this register. The multiplexer 42 is used to send logic 0 values during the first implementation of the steps 1–6. The use of this multiplexer 42 makes it possible to prevent the need to initialize the register 11. Other functions may be implemented in the coprocessor of FIGS. 2 or 3. The implementation may be expressed by the addition of additional circuits on the data paths shown. The added elements enable the implementation of the method described above. Furthermore, those skilled in the art realize that the addition circuits 30 and 31 and subtraction circuits 27–29 cause delays which have not been taken into account in the present description. Elementary delay cells must therefore be planned, as was the case with prior art circuits to ensure the efficient synchronization of the data paths with one another.

Variations are possible with respect to the formats of the data elements. The registers 11, 12, 13 and 40 are m*k bit registers that can be configured into registers with a size that is a multiple of k bits. It is possible to permanently fix the size of these registers at the maximum size. This would lead to a loss of time, but simplifies the sequencing to be done. If a fixed size is used, the unused most significant words of the different operands are filled with logic 0 values.

Modifications and other embodiments of the invention exist based upon the foregoing descriptions and the associated drawings. Therefore, it is to be understood that the invention is not to be limited to the specific embodiments disclosed.

That which is claimed is:

1. A method for implementing a Pfield operation defined according to the Montgomery method by $P_{field}(A, B)_N = A*B*I \bmod N$, with A, B and N being integers encoded respectively on α, b and n words of k bits, with N being an odd-parity number, with b and n being non-zero integers smaller than or equal to an integer m, and with α and m being non-zero integers, the method comprising the steps of:

successively receiving words $A_{i-1}$ of k bits of A in a first k bit register;

storing B in a second m*k bit shift register;

storing an updated data element S(i) in a third m*k bit shift register;

storing N in a fourth m*k bit shift register, the second to fourth registers being organized in banks of m sub-registers for enabling shifts by k bit words;

performing a first k bit shifting of least significant words in the second to fourth registers for serial production of an intermediate data element $Y_0=((-N_0^{-1} \mod 2^k)*(B*A_{i-1}+S(i-1))) \mod 2^k$ for storing in a fifth k bit register; and performing a second n*k bit shifting of the words B, S(i−1) and N stored in the second to fourth registers for serial production of the updated data element S(i).

2. A method according to claim 1, further comprising the following steps E1 to E3 to be repeated α times, with i being an integer index varying from 1 to α that is incremented at the end of each repetition of steps:

Step E1: computing $Y_0$ by performing a k bit shift of least significant words of B, S(i−1) and N stored in the second and third registers, with the second and third registers each having an input and an output, with the input connected to the corresponding output of each register to keep k bit word in one and the same corresponding sub-register after having provided the k bit word;

during the k bit shift, producing $A_{i-1}*B_0$ in a first multiplication circuit, substracting $N_0$ from $S(i-1)_0$ in a first subtraction circuit if S(i−1) is greater than N, producing k least significant bits of $X=S(i-1)+A_i*B$ in a first addition circuit by adding up an output result from the first multiplication circuit with an output result from the first subtraction circuit, producing $Y_0$ by multiplying the k least significant bits of X by $-N_0^{-1} \mod 2^k$ in a second multiplication circuit, and storing an output result of the second multiplication circuit in the fifth register;

Step E2: computing S(i) by simultaneously shifting by n*k bits contents of the second to fourth registers; performing the multiplication $B*A_{i-1}$ in the first multiplication circuit; substracting N from S(i−1) in the first subtraction circuit if S(i−1) is greater than N; producing $X=S(i-1)+A_i*B$ in the first addition circuit by adding up an output result from the first multiplication circuit with an output result from the first subtraction circuit; producing $X*Y_0$ in the second multiplication circuit; producing $Z=X+(N*Y_0)$ in a second addition circuit by adding up an output result from the first multiplication circuit with an output result from the first addition circuit, wherein k first output bits from the second addition circuit are overlooked, storing an updated data element S(i) in the third register, the k-bit word $Z_1$ corresponding to the second least significant word of Z becomes the least significant word of the updated data element S(i);

Step E3: comparing the updated data element S(i) with N, and storing a result of the comparison, and the result is taken into account during a following repetition of the steps E1 and E2.

3. An integrated circuit for implementing a Pfield operation defined according to the Montgomery method by $P_{field}(A,B)_N=A*B*I \mod N$, with A, B and N being integers encoded respectively on a, b and n words of k bits, with N being an odd-parity number, with b and n being non-zero integers smaller than or equal to an integer m, and with α and m being non-zero integers, the integrated circuit comprising:

a processor including a plurality of registers, said processor comprising means for performing the following steps successively receiving words $A_{i-1}$ of k bits of A in a first k bit register, storing B in a second m*k bit shift register, storing an updated data element S(i) in a third m*k bit shift register, storing N in a fourth m*k bit shift register, the second to fourth registers being organized in banks of m sub-registers for enabling shifts by k bit words, performing a first k bit shifting of least significant words in the second to fourth registers for serial production of an intermediate data element $Y_0+((-N_0^{-1} \mod 2^k)*(B*A_{i-1}+S(i-1))) \mod 2^k$ for storing in a fifth k bit register, and performing a second n*k bit shifting of the words B, S(i−1) and N stored in the second to fourth registers for serial production of the updated data element S(i).

4. An intergrated circuit according to claim 3, wherein said processor further comprises a plurality of addition circuits, subtraction circuits and multiplication circuits; and said processor further comprises means for performing the following steps E1 to E3 to be repeated α times, with i being an integer index varying from 1 to α that is incremented at the end of each repetition of steps:

Step E1: computing $Y_0$ by performing a k bit shift of least significant words of B, S(i−1) and N stored in the second and third registers, with the second and third registers each having an input and an output, with the input connected to the corresponding output of each register to keep k bit word in one and the same corresponding sub-register after having provided the k bit word;

during the k bit shift, producing $A_{i-1}*B_0$ in a first multiplication circuit, substracting $N_0$ from $S(i-1)_0$ in a first subtraction circuit if S(i−1) is greater than N, producing k least significant bits of $X=S(i-1)+A_i*B$ in a first addition circuit by adding up an output result from the first multiplication circuit with an output result from the first subtraction circuit, producing $Y_0$ by multiplying the k least significant bits of X by $-N_0^{-1} \mod 2^k$ in a second multiplication circuit, and storing an output result of the second multiplication circuit in the fifth register;

Step E2: computing S(i) by simultaneously shifting by n*k bits contents of the second to fourth registers; performing the multiplication $B*A_{i-1}$ in the first multiplication circuit; substracting N from S(i−1) in the first subtraction circuit if S(i−1) is greater than N; producing $X=S(i-1)+A_i*B$ in the first addition circuit by adding up an output result from the first multiplication circuit with an output result from the first subtraction circuit; producing $X*Y_0$ in the second multiplication circuit; producing $Z=X+(N*Y_0)$ in a second addition circuit by adding up an output result from the first multiplication circuit with an output result from the first addition circuit, wherein k first output bits from the second addition circuit are overlooked, storing an updated data element S(i) in the third register, the k-bit word $Z_1$ corresponding to the second least significant word of Z becomes the least significant word of the updated data element S(i);

Step E3: comparing the updated data element S(i) with N, and storing a result of the comparison, and the result is taken into account during a following repetition of the steps E1 and E2.

* * * * *

UNITED STATES PATENT AND TRADEMARK OFFICE
CERTIFICATE OF CORRECTION

PATENT NO. : 6,275,837 B1
DATED : August 14, 2001
INVENTOR(S) : Bernard Plessier It is certified that error appears in the above-identified patent and that said Letters Patent is hereby corrected as shown below:

<u>Column 4,</u>
Lines 20 and 21, delete "$Y_0+((-N_0^{-1}mod2^k)*(B*A_{i-1}+S(i-1)) \, mod2^k$" insert
-- $Y_0=((-N_0^{-1}mod2^k)*(B*A_{i-1}+S(i-1)) \, mod2^k$ --

<u>Column 6,</u>
Line 44, delete "on α words" insert -- on a words --
Line 46, delete "In addition, α, b" insert -- In addition, a , b --

<u>Column 10,</u>
Lines 22 and 23, delete "$Y_0+((-N_0^{-1}mod2^k)*(B*A_{i-1}+S(i-1)) \, mod2^k$" insert
-- $Y_0=((-N_0^{-1}mod2^k)*(B*A_{i-1}+S(i-1)) \, mod2^k$ --

Signed and Sealed this

Eleventh Day of June, 2002

*Attest:*

JAMES E. ROGAN
*Attesting Officer*     *Director of the United States Patent and Trademark Office*